US011974089B2

(12) United States Patent
Okada et al.

(10) Patent No.: US 11,974,089 B2
(45) **Date of Patent: *Apr. 30, 2024**

(54) INFORMATION PROCESSING DEVICE, SOUND EMISSION CONTROL METHOD, SOUND EMISSION CONTROL PROGRAM, AND ACOUSTIC SYSTEM

(71) Applicant: TOYOTA JIDOSHA KABUSHIKI KAISHA, Toyota (JP)

(72) Inventors: Hiroki Okada, Toyota (JP); Daisuke Hiroki, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 7 days.

This patent is subject to a terminal disclaimer.

(21) Appl. No.: 18/080,485

(22) Filed: Dec. 13, 2022

(65) Prior Publication Data

US 2023/0106991 A1 Apr. 6, 2023

Related U.S. Application Data

(60) Continuation of application No. 17/475,921, filed on Sep. 15, 2021, now Pat. No. 11,558,688, which is a (Continued)

(30) Foreign Application Priority Data

May 28, 2018 (JP) ................................ 2018-101581

(51) Int. Cl.
*H04R 1/10* (2006.01)
*H04R 29/00* (2006.01)

(52) U.S. Cl.
CPC ......... *H04R 1/1041* (2013.01); *H04R 1/1016* (2013.01); *H04R 29/001* (2013.01)

(58) Field of Classification Search
CPC ... H04R 1/1041; H04R 1/1016; H04R 29/001
(Continued)

(56) References Cited

U.S. PATENT DOCUMENTS 11,558,688 B2 * 1/2023 Okada .................. H04R 1/1041
2016/0212522 A1 * 7/2016 Lee ....................... B60W 50/14
(Continued)

FOREIGN PATENT DOCUMENTS

CN 2686262 Y 3/2005
CN 105812974 A 7/2016
(Continued)

*Primary Examiner* — Paul Kim
(74) *Attorney, Agent, or Firm* — Oliff PLC

(57) ABSTRACT

An acoustic system includes an in-vehicle device including a vehicle-side communicator; and an information processing device configured to be worn at an ear of a user and to communicate with the vehicle-side communicator. The information processing device includes: a sound pickup configured to pick up external sound; a sound emitter configured to emit sound to the ear of the user; a communicator configured to communicate with the in-vehicle device; and a computer. The computer is programmed to: determine, based on a result of communication with the in-vehicle device by the communicator, whether or not a predetermined condition is satisfied in a state where the information processing device is in a vehicle; and when determining that the predetermined condition is satisfied, cause the sound emitter to emit the external sound picked up by the sound pickup.

4 Claims, 3 Drawing Sheets

Related U.S. Application Data division of application No. 16/376,004, filed on Apr. 5, 2019, now Pat. No. 11,153,673.

(58) Field of Classification Search

USPC ........................................................ 381/56, 86

See application file for complete search history.

(56) References Cited

U.S. PATENT DOCUMENTS

| | | | |
|---|---|---|---|
| 2018/0040093 | A1 | 2/2018 | Boesen |
| 2020/0092628 | A1 | 3/2020 | Osugi et al. |

FOREIGN PATENT DOCUMENTS

| | | |
|---|---|---|
| JP | 2008-100598 | 5/2008 |
| JP | 2010-086328 A | 4/2010 |

* cited by examiner

INFORMATION PROCESSING DEVICE, SOUND EMISSION CONTROL METHOD, SOUND EMISSION CONTROL PROGRAM, AND ACOUSTIC SYSTEM

CROSS-REFERENCE TO RELATED APPLICATION

This is a Continuation of application Ser. No. 17/475,921 filed Sep. 15, 2021, which in turn is a Division of application Ser. No. 16/376,004 filed Apr. 5, 2019, which claims the benefit of Japanese Patent Application No. 2018-101581 filed May 28, 2018. The disclosure of the prior applications is hereby incorporated by reference herein in its entirety.

BACKGROUND OF THE INVENTION

Field of the Invention

The present invention relates to an information processing device to be worn at an ear of a user; a sound emission control method; a sound emission control program; and an acoustic system.

Description of the Background Art

In recent years, information processing devices (hearable devices) of an earphone type, a headphone type, or the like, which have advanced processing capability and which, for example, store content data such as music and wirelessly or otherwise receive such content data from an external device so that the content data can be played, have been proposed. A user wearing such an information processing device can casually listen to music and the like anywhere, or can further use various kinds of services using voices and the like. However, while a vehicle is being driven, when an information processing device covering an ear of a user plays music or the like, it becomes hard to hear ambient sound, and thus such playback is not preferable. In order to solve this problem, patent document 1 (Japanese Laid-Open Patent Publication No. 2008-100598) discloses a vehicular acoustic system which, when predetermined communication is established between a headphone-type information processing device and an in-vehicle device, makes a notification for prompting the user to take off the information processing device, or stops the playback of music or the like being performed by the information processing device.

In the acoustic system of patent document 1, while a user is driving a vehicle, the information processing device covering the ear has to be taken off in order to allow ambient sound to be heard well, and thus convenience for the user is low.

SUMMARY OF THE INVENTION

The present invention has been made in view of the aforementioned problem, and an object of the present invention is to provide an information processing device having improved convenience in a case where a vehicle is driven while the information processing device is worn.

In order to attain the above-described object, one aspect of the present invention is an information processing device having a to-be-worn portion capable of being worn at one ear of a user, the information processing device including: a first sound pickup section configured to pick up external sound; a sound emission section configured to emit sound to the one ear of the user; and a control section configured to determine whether or not a predetermined condition is satisfied in a state where the information processing device is in a vehicle, and, when determining that the predetermined condition is satisfied, cause the sound emission section to emit the external sound picked up by the first sound pickup section.

Accordingly, since switching to a state where external (ambient) sound is emitted is made when the predetermined condition is satisfied, ambient sound can be made easily heard without taking off the information processing device from the ear, in a case where, for example, the vehicle is highly likely to be driven.

In addition, when causing the sound emission section to emit the external sound picked up by the first sound pickup section, the control section may amplify a sound pressure of the external sound before causing the external sound to be emitted.

Accordingly, ambient sound can be made easily heard more clearly.

In addition, the information processing device may further include another to-be-worn portion capable of being worn at another ear of the user, wherein the control section further makes a notification for prompting the user to take off either the to-be-worn portion or the other to-be-worn portion if the predetermined condition is satisfied when the to-be-worn portion and the other to-be-worn portion are worn at the other ear and the other ear of the user.

Accordingly, in a case where a law is set forth that the user must not wear the information processing device at both ears at the same time during driving, the user can be prompted to drive in compliance with the law.

In addition, the predetermined condition may be that the user is seated on a driver seat of the vehicle.

Accordingly, it can be suitably determined that the user is highly likely to drive the vehicle.

In addition, the sound emission section may emit sound for authentication having a predetermined frequency and a predetermined sound pressure into an ear hole of the one ear of the user, the information processing device may further include a second sound pickup section configured to pick up an echo, from the ear hole, caused by the sound for authentication, and the control section may perform authentication of the user on the basis of the echo.

Accordingly, control of access to the information processing device and the vehicle can be performed with use of the result of the authentication.

Another aspect of the present invention is a sound emission control method to be executed by a computer of an information processing device which has a to-be-worn portion capable of being worn at one ear of a user, and which includes a sound pickup section configured to pickup external sound and a sound emission section configured to emit sound to the one ear of the user, the sound emission control method including: a step of determining whether or not a predetermined condition is satisfied in a state where the information processing device is in a vehicle; and a step of causing, when it is determined that the predetermined condition is satisfied in the step of performing the determination, the sound emission section to emit the external sound picked up by the sound pickup section.

Another aspect of the present invention is a computer-readable non-transitory storage medium storing a sound emission control program to be executed by a computer of an information processing device which has a to-be-worn portion capable of being worn at one ear of a user, and which includes a sound pickup section configured to pick up external sound and a sound emission section configured to emit sound to the one ear of the user, the second emission control program including: a step of determining whether or not a predetermined condition is satisfied in a state where the information processing device is in a vehicle; and a step of causing, when it is determined that the predetermined condition is satisfied in the step of performing the determination, the sound emission section to emit the external sound picked up by the sound pickup section.

Another aspect of the present invention is an acoustic system including an in-vehicle device and an information processing device which is to be worn at at least one ear of a user, wherein the in-vehicle device includes a vehicle-side communication section configured to communicate with the information processing device, and the information processing device includes: a sound pickup section configured to pick up external sound; a sound emission section configured to emit sound to the at least one ear of the user; a communication section configured to communicate with the in-vehicle device; and a control section configured to determine, on the basis of a result of communication with the in-vehicle device by the communication section, whether or not a predetermined condition is satisfied in a state where the information processing device is in a vehicle, and, when determining that the predetermined condition is satisfied, cause the sound emission section to emit the external sound picked up by the sound pickup section.

Owing to these features, since switching to the state where external (ambient) sound is emitted is made when the predetermined condition is satisfied, ambient sound can be made easily heard without taking off the information processing device from the ear, while, for example, a vehicle is being driven.

ADVANTAGEOUS EFFECTS OF THE INVENTION

As described above, in the present invention, switching to a state where external (ambient) sound is emitted is made when the predetermined condition is satisfied in the vehicle, and thus ambient sound can be made easily heard without taking off the information processing device from the ear while, for example, the vehicle is being driven, whereby an information processing device having improved convenience can be provided.

DESCRIPTION OF THE PREFERRED EMBODIMENTS (Outline)

An example of an information processing device according to the present invention is an earphone-type information processing device to be worn in an ear of a user, and is a so-called bearable device that can play music and the like and provide services using voices and the like. In the information processing device according to the present invention, switching to an ambient mode for picking up external sound and emitting the external sound to the ear of the user, is made when a predetermined condition indicating that the user is highly likely to drive is satisfied in a vehicle, whereby ambient sound can be made easily heard while the vehicle is being driven, without taking off the information processing device from the ear.

(Embodiment)

Hereinafter, an embodiment of the present invention will be described in detail with reference to the drawings.

<Configuration>

Figure 1:
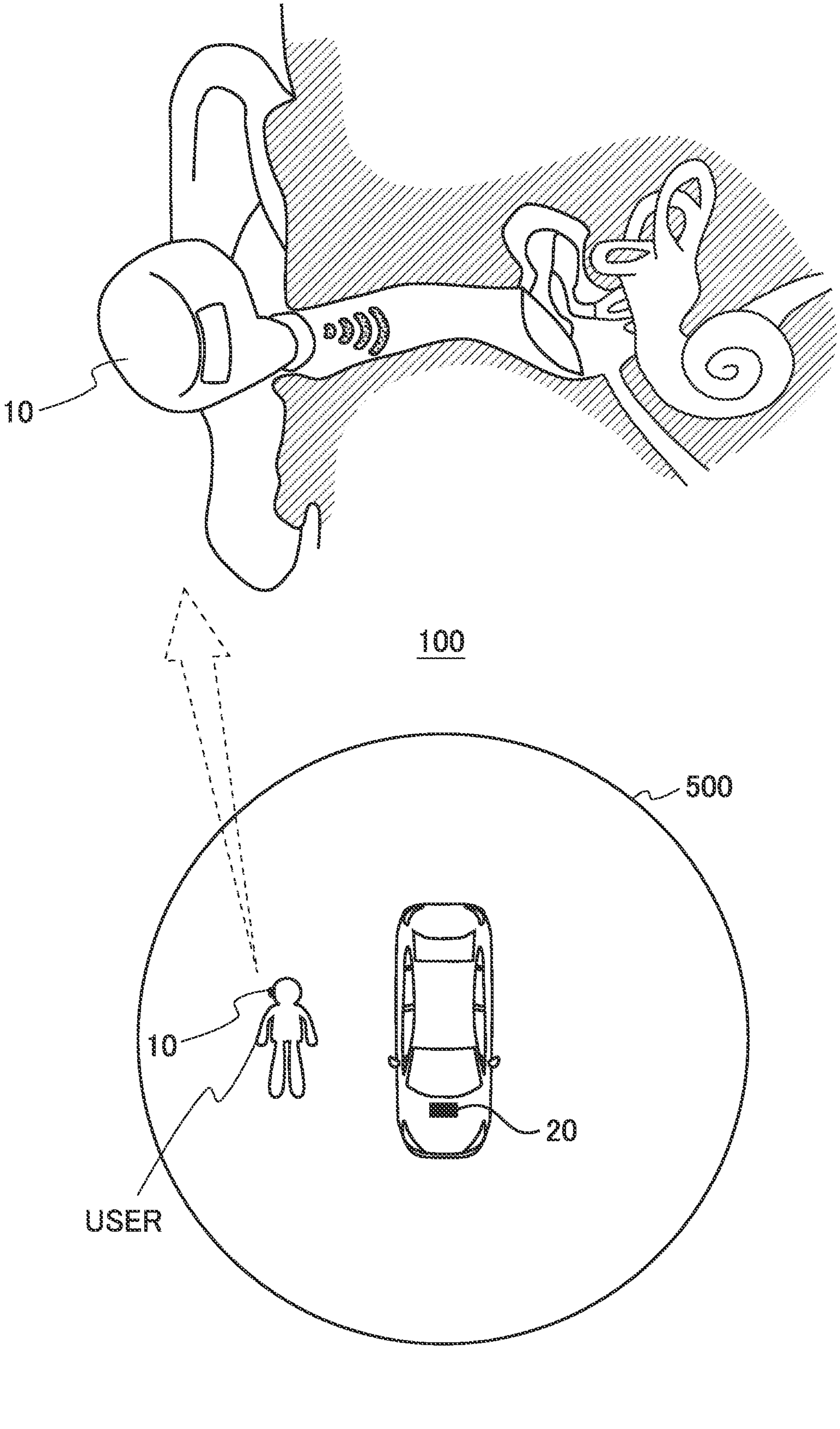
FIG. 1 is a view indicating a configuration example of an acoustic system according to an embodiment of the present invention.

FIG. 1 shows a configuration example of an acoustic system 100 according to the present embodiment. The acoustic system 100 includes, for example, an information processing device 10 to be worn in one ear of a user, and an in-vehicle device 20 mounted in a vehicle. When being located within a predetermined range 500 from the in-vehicle device 20, the information processing device 10 can wirelessly communicate with the in-vehicle device 20.

Figure 2:
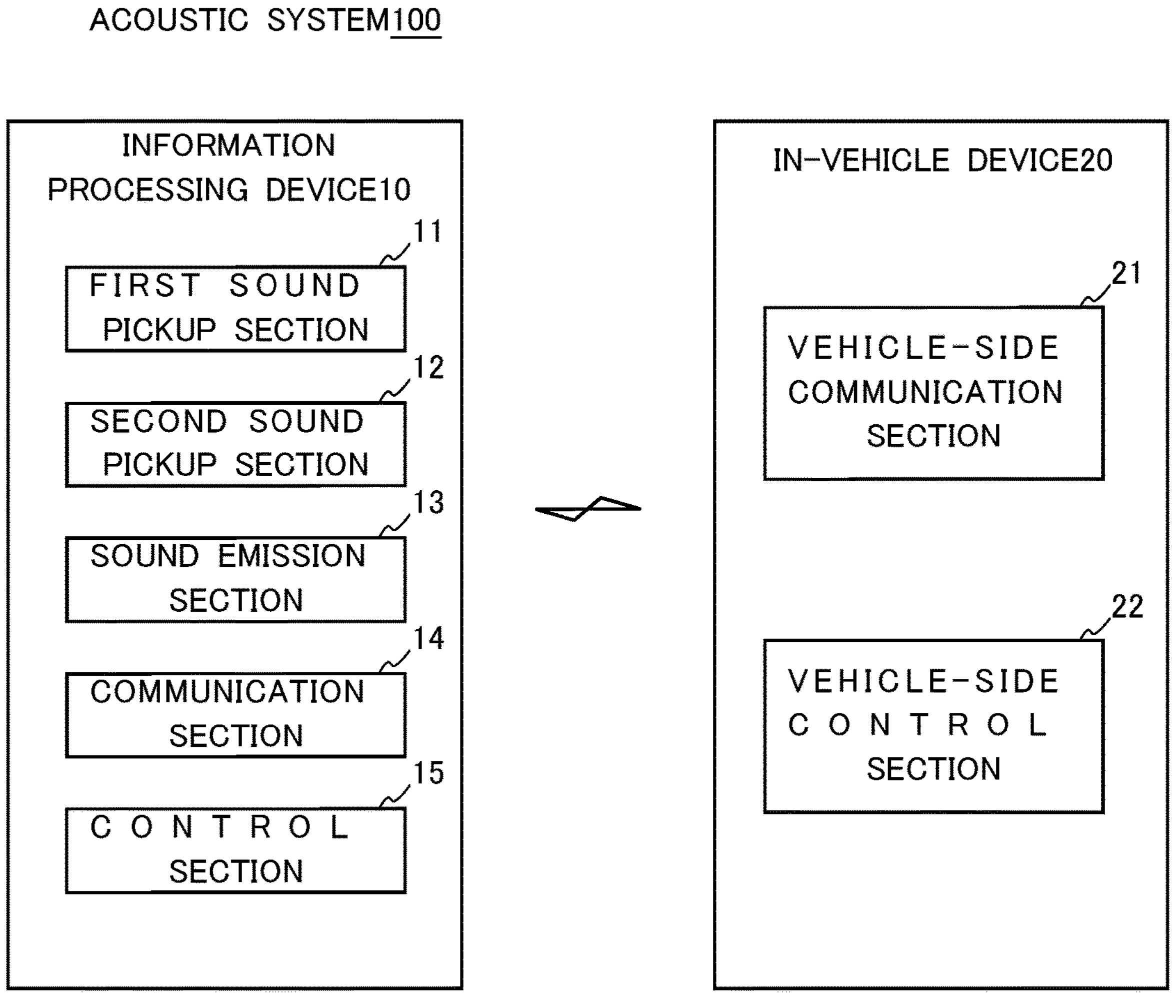
FIG. 2 is a functional block diagram of the acoustic system according to the embodiment of the present invention.

FIG. 2 indicates an example of a functional block of the acoustic system 100. The information processing device 10 includes: a sound emission section 13 which emits sound to the one ear of the user; a first sound pickup section 11 which picks up external (ambient) sound from around the information processing device 10; a second sound pickup section 12 which picks up sound in the auditory canal (ear hole) of the one ear of the user; a communication section 14 which wirelessly communicates with an external device such as the in-vehicle device 20; and a control section 15 which controls each of these sections. These functions are provided to a to-be-worn portion that is to be worn in the one ear of the user. It is noted that, for example, at least some of the functions of the control section 15 may be provided to a portable device separate from the to-be-worn portion.

The in-vehicle device 20 includes: a vehicle-side communication section 21 which communicates with the information processing device 10 and the like; and a vehicle-side control section 22 which controls the vehicle-side communication section 21 and exchanges information with another in-vehicle device.

<Process>

Figure 3:
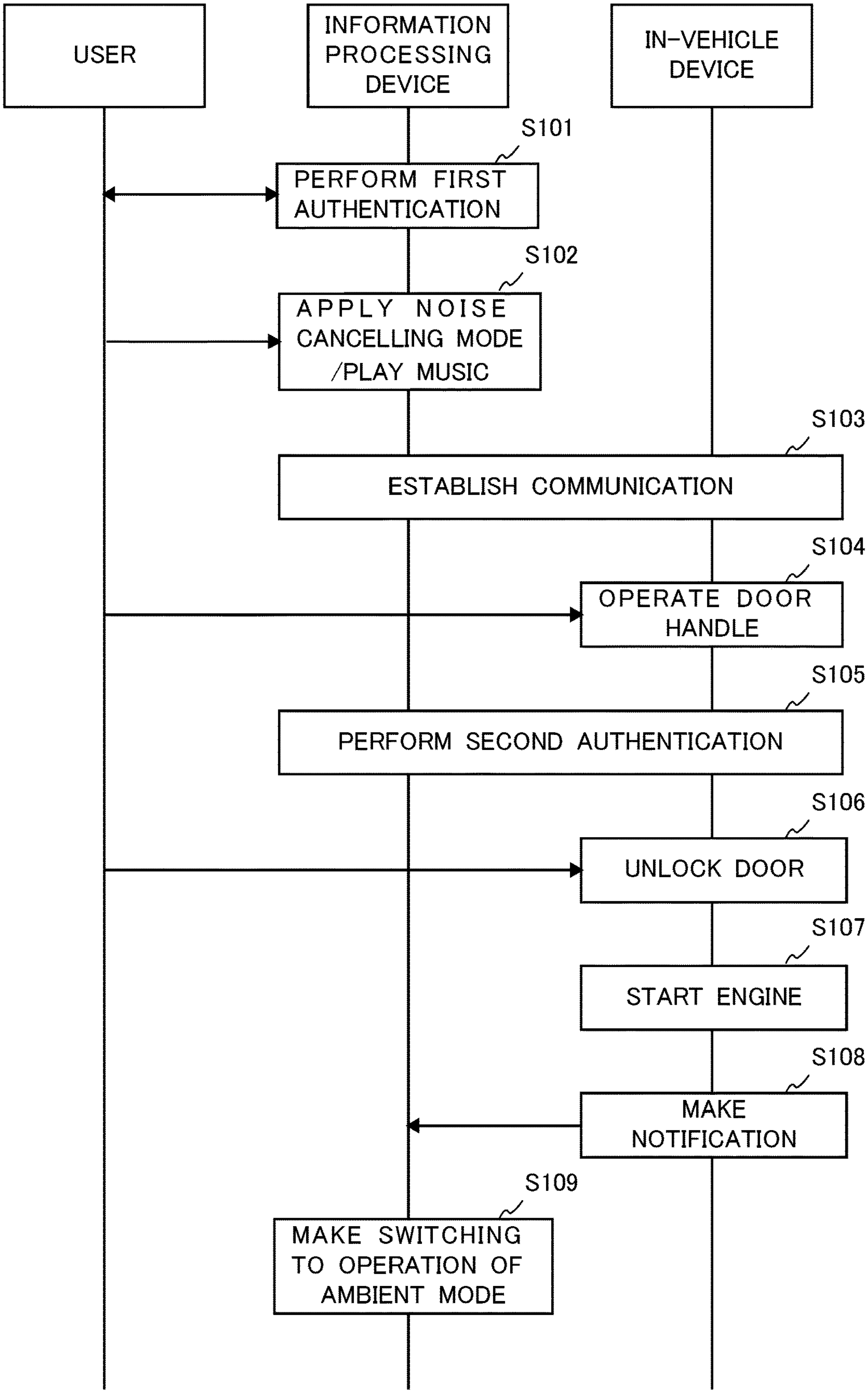
FIG. 3 is a sequence diagram indicating processes according to the embodiment of the present invention.

FIG. 3 is a sequence diagram for explaining processes by the information processing device 10 and the in-vehicle device 20. The details of the processes will be described with reference to FIG. 3. The processes are started when, for example, a user wears the information processing device 10 in an ear.

(Step S101): The control section 15 of the information processing device 10 causes the sound emission section 13 to emit sound for authentication having a predetermined frequency and a predetermined sound pressure into the ear hole of the user. The control section 15 causes the second sound pickup section 12 to pick up an echo, in the ear hole of the user, caused by the sound for authentication. The pattern of the sound pressure characteristic, with respect to frequency, of the echo varies among ear holes. The control section 15 calculates a degree of matching between the characteristic of the picked-up echo and the characteristic, of an echo in an ear hole of an authorized user, registered in the information procession device 10 in advance. In a case where the degree of matching is higher than a predetermined value, the control section 15 authenticates the user as the authorized user for the information processing device 10 (first authentication). This first authentication is executed every time the user takes off the information processing device 10 from the ear and wears it again.

(Step S102): The control section 15 of the information processing device 10 causes the sound emission section 13 to play music or the like, on the basis of an operation by the user authenticated in the first authentication. In addition to or instead of the above, the control section 15 may perform an operation of a noise cancelling mode in which the control section 15 causes the first sound pickup section 11 to pick up external sound, generates a sound having a phase reverse to that of the picked-up external sound, and causes the sound emission section 13 to emit the generated sound, thereby cancelling the external sound in the ear of the user.

(Step S103): When the user wearing the information processing device 10 approaches the vehicle to get on the vehicle and comes within the above-described range 500, the information processing device 10 and the in-vehicle device 20 become able to communicate with each other. When the communication section 14 receives radio waves from the in-vehicle device 20, the control section 15 of the information processing device 10 detects that communication therewith can be performed. Meanwhile, when the vehicle-side communication section 21 receives radio waves from the information processing device 10, the vehicle-side control section 22 of the in-vehicle device 20 detects that communication therewith can be performed.

(Step S104): When the user performs a touch operation on a door handle of the vehicle and a sensor of the vehicle detects the touch operation, the vehicle-side control section 22 of the in-vehicle device 20 acquires a result of the detection.

(Step S105): The vehicle-side control section 22 of the in-vehicle device 20 performs second authentication. The second authentication is performed through the following method. The vehicle-side control section 22 communicates with the information processing device 10 via the vehicle-side communication section 21, and performs, on the basis of a result of the communication, detection as to whether the information processing device 10 is a device registered in advance. In addition, the vehicle-side control section 22 receives the result of the first authentication from the information processing device 10. If the information processing device 10 is the device registered in advance and the result of the first authentication is successful, the vehicle-side control section 22 authenticates the user as an authorized user for the vehicle. Alternatively, from the information processing device 10, the vehicle-side control section 22 may receive, instead of the result of the first authentication, information indicating an echo of the user picked up by the second sound pickup section 12. In this case, the vehicle-side control section 22 calculates a degree of matching with the characteristic, of an echo in an ear hole of the authorized user for the vehicle, registered in advance in the in-vehicle device 20 or a server that is a predetermined enquiry destination. In a case where the degree of matching is higher than a predetermined value, the vehicle-side control section 22 authenticates the user as the authorized user for the vehicle.

(Step S106): If the second authentication is successful, the vehicle-side control section 22 of the in-vehicle device 20 unlocks the door.

(Step S107): The user opens the door, gets on the vehicle, and starts the engine of the vehicle (turns on a power switch). At a time when the ignition switch (power switch) is operated to be ON, the vehicle-side control section 22 of the in-vehicle device 20 may perform the second authentication again.

(Step S108): The vehicle-side control section 22 of the in-vehicle device 20 causes the vehicle-side communication section 21 to transmit a notification in response to the starting, by the user, of the engine of the vehicle.

(Step S109): When the communication section 14 receives the notification, the control section 15 of the information processing device 10 determines, on the basis of the notification, that a predetermined condition described later is satisfied in the vehicle. Accordingly, the control section 15 performs an operation of an ambient mode in which the control section 15 stops playback of the music or the like and the operation of the noise cancelling mode, causes the first sound pickup section 11 to pick up external sound, and causes the sound emission section 13 to emit the picked-up external sound, thereby allowing the external sound to reach the ear of the user. At this time, the sound to be emitted by the sound emission section 13 may be a sound obtained by amplifying the external sound picked up by the first sound pickup section 11, so as to allow the external sound to be more clearly heard by the user. In the ambient mode, the music or the like being played may be kept played so as to be overlaid on the external sound as long as the user can hear the external sound. After the above-described steps, the process is ended. The above-described steps may be changed in terms of details and order, or omitted, as appropriate.

When the user gets out of the above-described range 500 and communication with the in-vehicle device 20 becomes unable to be performed, the information processing device 10 may restart the playback of music or the like and the operation of the noise cancelling mode. Alternatively, the information processing device 10 may be configured to be able to detect, through communication with the in-vehicle device 20, that the driving has been ended, by detecting, for example: stoppage of the engine; user's getting out of the vehicle in addition o the stoppage of the engine; or a door-locking operation in addition to the stoppage of the engine and the user's getting out of the vehicle. By being so configured, the information processing device 10 may restart the playback of music or the like and the operation of the noise cancelling mode in response to the detection of any of these conditions.

As described above, in a case where the information processing device 10 is worn by an authorized user for a vehicle and a predetermined condition that, for example, the user starts the engine or turns on the power switch as described above is satisfied in the vehicle, the information processing device 10 applies the ambient mode in which ambient sound is easily heard. The predetermined condition is not limited thereto, and may be to detect that releasing of the parking brake is also performed after the engine is started. Alternatively, the predetermined condition may be to detect that the user is seated on the driver seat. This detection can be performed as follows, for example: the vehicle-side communication section 21 of the in-vehicle device 20 is provided with a speaker for emitting, in the vehicle, an audible sound having a predetermined pattern, or an inaudible sound, specifically an ultrasound or an extremely-low-frequency sound, having the predetermined pattern, and the information processing device 10 performs, by means of sound-based communication in which the first sound pickup section 11 thereof picks up a sound having the predetermined pattern, position measurement based on the sound pressure or the reaching time period of the sound. Alternatively, communication may be used that is based on, instead of such a sound, a very faint radio wave with the range of the driver seat being a reaching range for the radio wave. Owing to the above, in a case where the user is a passenger who is not authenticated in the second authentication, or in a case where, even if being authenticated in the second authentication, the user simply performs unloading or the like but does not start the engine or is not seated on the driver seat, the operation of the information processing device 10 is unchanged, and the user can suitably listen to music and the like.

(Modification 1)

If the information processing device 10 described in the above-described embodiment is used as each of two devices forming one pair and the devices are operated as appropriate so as to be linked to each other by means of, for example, wireless communication, a single information processing apparatus is obtained that has the to-be-worn portion capable of being worn in the one ear and another to-be-worn portion capable of being worn in the other ear so that the information processing apparatus can be worn in both ears. In this case, an echo in either one of the ears, or echoes in both ears, may be used for the above-described authentication. By performing the same process as that described above, the ambient mode can be applied for both ears when it is determined that the predetermined condition is satisfied in the vehicle. In addition, for compliance with a law described later, a notification may be made for prompting the user to take off at least one of the to-be-worn portion and the other to-be-worn portion from the ear. The notification may be made with use of sounds, or may be made with use of vibrations, with a vibrator being included. In addition, the control section 15 of the information processing apparatus may be configured to determine whether or not the to-be-worn portion and the other to-be-worn portion are worn in the respective ears, and make such a notification if these portions are worn in the respective ears. Whether or not these portions are worn in the respective ears may be determined as follows, for example: the respective to-be-worn portions are provided with contact sensors at locations where the to-be-worn portions come into contact with the respective ears, and the determination is performed on the basis of detection results from the contact sensors; or the determination is performed on the basis of whether or not echoes in both ears can be acquired after the above-described sound for authentication is emitted.

Such an information processing apparatus capable of being worn in both ears can be configured by the single information processing device 10 described in the above-described embodiment being further provided with another to-be-worn portion to be worn in the other ear of the user, and being provided, as appropriate, with a sound emission section, a sound pickup section, a contact sensor, a communication section capable of communicating with the control section 15, and the like which are for the other ear and which can be controlled from the control section 15.

Depending on the country, a law is set forth that earphones and the like must not be worn in both ears at the same time during driving. Therefore, in a country in which such a law is set forth, a state where at least one ear is uncovered needs to be obtained regardless of whether or not to apply the ambient mode. By giving the above-described notification to the user, the user can be prompted to drive in compliance with the law. If the user ignores the notification and continues wearing the information processing device 10 in both ears for a predetermined time period, the following operation may be performed: the control section 15 of the information processing device 10 detects this continued wearing and causes the communication section 14 to give a notification to the in-vehicle device 20, then the vehicle-side control section 22 of the in-vehicle device 20 receives the notification via the vehicle-side communication section 21 and instructs another in-vehicle device to stop the engine (or motor). Accordingly, driving that does not comply with the law, can be forcedly prohibited.

(Modification 2)

The information processing device 10 described in the above-described embodiment and the information processing apparatus according to modification 1, may not include the second sound pickup section 12, and may not perform such echo-based user authentication as that described above. In this case, control of access such as unlocking a door of a vehicle can be performed with use of another smart key system or the like. Also in this case, ambient sound can be made easily heard while the user is driving, by applying the ambient mode when it is determined, by means such as communication with the in-vehicle device 20 or sound waves from the in-vehicle device 20, that the above-described predetermined condition that, for example, the engine is started or the user is seated on the driver seat is satisfied in a state where the information processing device 10 is in the vehicle.

(Effect)

As described above, the information processing device according to the present invention performs the process of applying the ambient mode when, for example, the predetermined condition indicating that the user is highly likely to drive is satisfied in the vehicle. Accordingly, the situation in which the user drives is determined, and, in a case where the user drives, ambient sound is easily heard without taking off the information processing device, whereby convenience is improved. In a case where the user does not drive, the operation of the information processing device is unchanged, and the user can suitably listen to music and the like. In addition, a notification can be made for compliance with the law. In addition, such situation-dependent switching of operations is automatically performed. Convenience can be improved also in terms of these features. In addition, in the case where the information processing device does not perform the user authentication but the in-vehicle device independently performs user authentication as in modification 2, the process of associating (pairing) the information processing device and the in-vehicle device with each other in advance is not necessary, whereby this associating process can be omitted.

Although the present invention has been described as above based on the embodiment thereof, the present invention can be taken as an information processing device, a sound emission control method and a sound emission control program to be executed by a control section included in the information processing device, a computer-readable non-transitory storage medium storing the sound emission control program, and an acoustic system including the information processing device and an in-vehicle device.

The present invention is useful for an information processing device and an acoustic system to be mounted to a vehicle or the like.

What is claimed is:

1. A system comprising an information processing device having a to-be-worn portion capable of being worn at one ear of a user and an in-vehicle device capable of communicating with the information processing device, the information processing device comprising:
- a first sound pickup configured to pick up external sound;
- a sound emitter configured to emit sound to the one ear of the user;
- an authenticator configured to authenticate the user based on acquired biological information; and
- a controller configured to cause, when the information processing device is in a vehicle and the authenticator authenticates the user as the authorized user, the sound emitter to emit the external sound picked up by the first sound pickup.

2. The system according to claim 1, wherein when causing the sound emitter to emit the external sound picked up by the first sound pickup, the controller amplifies a sound pressure of the external sound before causing the external sound to be emitted.

3. The system according to claim 1, wherein the sound emitter emits sound for authentication having a predetermined frequency and a predetermined sound pressure into an ear hole of the one ear of the user, the information processing device further comprises a second sound pickup configured to pick up an echo, from the ear hole, caused by the sound for authentication, and the controller performs authentication of the user on the basis of the echo.

4. A sound emission control method to be executed by a computer of a system comprising an information processing device having a to-be-worn portion capable of being worn at one ear of a user, and which includes a sound pickup configured to pick up external sound and a sound emitter configured to emit sound to the one ear of the user, and an in-vehicle device capable of communicating with the information processing device, the sound emission control method comprising:

authenticating the user based on acquired biological information; and causing, when the information processing device is in a vehicle and the authenticator authenticates the user as the authorized user, the sound emitter to emit the external sound picked up by the sound pickup.

* * * * *